United States Patent [19]

Price

[11] Patent Number: 5,056,122
[45] Date of Patent: Oct. 8, 1991

[54] PHASE-SHIFT KEYED DEMODULATION APPARATUS

[75] Inventor: Alistair J. Price, Dallas, Tex.

[73] Assignee: Rockwell International Corporation, El Segundo, Calif.

[21] Appl. No.: 366,950

[22] Filed: Jun. 16, 1989

[51] Int. Cl.$^5$ .......................................... H04L 27/22
[52] U.S. Cl. ..................... 375/80; 327/304; 375/56; 375/84
[58] Field of Search ........... 375/27, 52, 56, 80, 375/82, 83, 84, 85; 329/304, 310, 311, 336, 304, 341, 327, 337, 342; 341/76

[56] References Cited

U.S. PATENT DOCUMENTS

| 3,022,461 | 2/1962 | Wilcox, Jr. | 329/336 |
| 3,336,578 | 8/1967 | Kuflik et al. | 375/84 |
| 3,392,337 | 7/1968 | Neuburger | 329/341 |
| 3,480,869 | 11/1969 | Hubbard | 375/84 |
| 3,980,824 | 9/1976 | Lamb et al. | 375/56 |
| 3,993,956 | 11/1976 | Gilmore et al. | 375/84 |
| 4,174,505 | 11/1979 | Querry | 375/56 |
| 4,547,739 | 10/1985 | Lutz | 329/336 |
| 4,706,261 | 11/1987 | Torre et al. | 375/56 |
| 4,754,228 | 6/1988 | Tomlinson | 329/336 |
| 4,804,925 | 2/1989 | Iwase et al. | 329/310 |
| 4,829,524 | 5/1989 | Shibano | 329/310 |
| 4,849,991 | 7/1989 | Arnold et al. | 375/84 |
| 4,878,029 | 10/1989 | Saulnier et al. | 329/341 |

Primary Examiner—Benedict V. Safourek
Attorney, Agent, or Firm—Bruce C. Lutz; V. Lawrence Sewell; H. Fredrick Hamann

[57] ABSTRACT

The present disclosure illustrates that the process of summing an amplitude limited PSK (phase-shift keyed) signal with a one data bit delayed version of that signal and envelope detecting the sum will produce a digital binary data stream that is representative of the original data used to produce the PSK signal in the first place. This approach is distinguished over the prior art approach in that the PSK signal is limited to an amplitude value which is less than the minimum value produced by vectorial summation of noise with the transmitted PSK signal for optimal bit error rate performance.

6 Claims, 1 Drawing Sheet

PHASE-SHIFT KEYED DEMODULATION APPARATUS

THE INVENTION

The present invention is concerned generally with electronics and more specifically with the demodulation of data signals. Even more specifically, it is concerned with the demodulation of phase-shift keyed signals in a cost efficient manner.

BACKGROUND

A common prior art approach to demodulating PSK (phase-shift keyed) signals is to apply the received PSK signal to one input of a multiplier circuit comprising a part of a double balanced modulator and to supply a one data bit delayed version of the same PSK signal to the second input of the multiplier circuit. As is well-known to those skilled in the art, the output of a multiplier circuit includes not only the sum and difference versions of the input signals, but also components of the original frequency input signals and various harmonics. Although the multiplier in a PSK demodulator is multiplying two identical frequency signals merely having different phases, the PSK signals are comprised of a high frequency carrier whose phase is modulated by the data rate. The result is a plurality of signal frequencies which are a function of the carrier frequency and the data rate and these other frequency components must be compensated for in the detection circuitry.

As may be realized by those skilled in the art, limiters are often used in connection with FSK (frequency shift keyed) demodulators. Limiters are used both with FSK demodulators having a delay and sum type construction as well as multiplier-type construction. The limiters in FSK circuits do improve the performance.

Prior attempts to use limiters in connection with PSK signal demodulation have shown that a limiter prior to a multiplier-type demodulator not only does not improve the bit error rate performance but actually degrades the performance of the circuit. It has been widely assumed by those skilled in the art that a limiter would therefore not significantly improve the performance of the previously inferior delay and sum approach to demodulating PSK signals. However, the applicant has discovered that such assumptions were incorrect.

The present invention accomplishes the demodulating action by summing the PSK signal with a one bit delayed version of the signal to produce an output signal which, when the two inputs are in-phase, has a double amplitude and when the two inputs are out-of-phase, has a cancelation effect or minimal output value. Thus, envelope detecting this signal will provide a data stream which is representative of the original input data.

Prior art attempts to accomplish the demodulating action by summing the PSK signal with a one bit delayed version as presented above, have typically been abandoned in situations where the inevitable noise signals, which vectorially add to the carrier signal, produce a resultant signal whose phase and amplitude changes to such a large extent that decisions made on the detected signal are unacceptably unreliable. This results in an unacceptably high BER (bit error rate).

The present invention overcomes this limitation or problem of the delay and sum type demodulator by inserting a limiter immediately prior to the delay and summing means which limiter reduces the amplitude of the signal to an amplitude which is less than the typical fluctuation extremes of the carrier as a result of the added noise (vectorial modulation). This constant amplitude and limited signal contains a sufficiently low phase distortion so that typical level detectors can more reliably distinguish between the logic levels represented by the phase alterations and thus, provide an acceptable bit error rate from the amplitude detector.

If the data transmitted was differentially encoded before being phase-shift keyed, the detected signal is directly representative of the input data stream. However, if the data stream transmitted was used to directly phase modulate the carrier to produce a phase-shift keyed signal, the envelope detected signal must be further processed to reestablish the original data stream. A limiter, summing circuit and envelope detector combination is more cost efficient to produce than is a multiplier and its accompanying spurious signal compensating circuits for high bit rates.

It may be noted that prior art FSK demodulators (discriminators) of the delay and multiply-type, have used limiters to remove the amplitude fluctuations contributed by noise and have been beneficial in improving the bit error rate of these demodulators. However, prior attempts to use limiters on multiply-type PSK demodulators have proven to have no beneficial effect since the only time a multiply PSK demodulator produces errors is when there is a signal vector in the wrong direction.

In view of the lack of beneficial effects of limiters applied to multiply-type PSK demodulators and the completely different attributes of FSK and PSK signals, it has been assumed by those in the field prior to the present invention that limiters would provide no performance benefit in delay and add or delay and subtract type demodulator circuits.

It is therefore an object of the present invention to provide an improved phase-shift keyed demodulator circuit.

Other objects and advantages of the present invention will be apparent from a reading of the specification and appended claims in conjunction with the drawings wherein:

DETAILED DESCRIPTION

Figure 1:
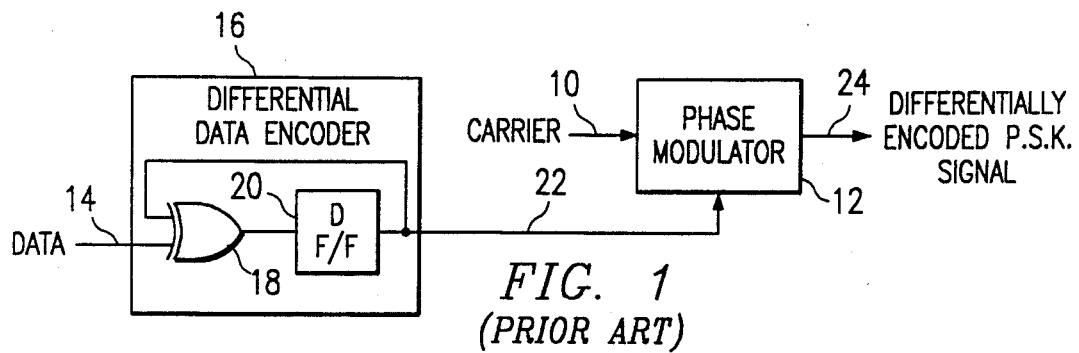
FIG. 1 is a block diagram of a prior art transmitter for transmitting differentially encoded PSK signals.

In FIG. 1 a carrier signal is supplied on a lead 10 to a phase modulator 12. A data signal is supplied on a lead 14 to the input of a block 16 containing an exclusive OR gate 18 and from gate 18 to a D flip-flop 20. The block 16 may be described as being a differential data encoder. An output of block 20 is supplied on a lead 22 to the phase modulator 12 as well as being returned as a second input to exclusive OR gate 18. An output of phase modulator 12 is supplied on a lead 24 as a differentially encoded PSK signal. This signal on lead 24 may be transmitted by any communication device to a receiver of PSK signals.

Figure 2:
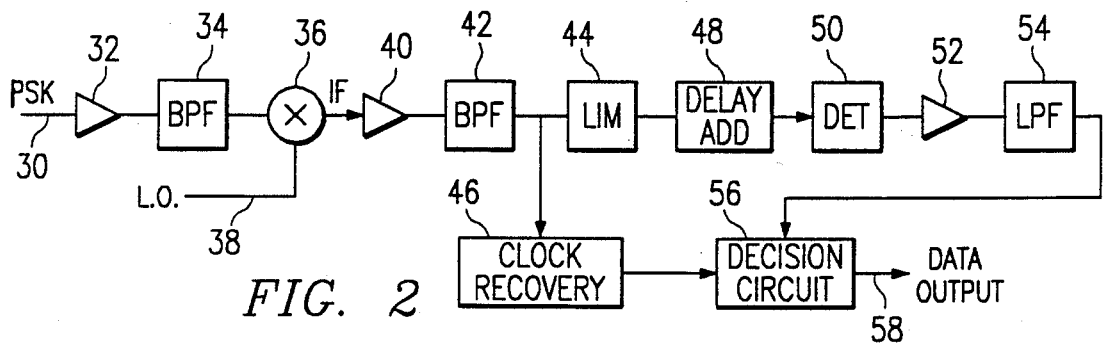
FIG. 2 is a block diagram of an overall receiver circuit, incorporating the inventive concept, for receiving PSK signals and outputting data identical to that supplied to the differential data encoder of FIG. 1.

In FIG. 2 a PSK signal is shown being received on a lead 30 and supplied to an amplifier 32 which provides an output to a bandpass filter 34. The output of bandpass filter 34 is supplied to a multiplier circuit 36 which receives a local oscillator signal on a lead 38 to produce an IF signal which is supplied to a further amplifier 40. An output of amplifier 40 is bandpass filtered in a block 42 and supplied to both a limiter 44 and a clock recovery circuit 46. An output of limiter 44 is supplied to a delay and add circuit 48 whose output is supplied to an envelope detector 50 before being amplified in amplifier 52 and low-pass filtered in a filter 54. The output of low-pass filter 54 is supplied to a decision circuit 56 which also receives a clock from clock recovery circuit 46. The output of decision circuit 56 is supplied on a lead 58. The data on lead 58 is substantially identical to that of lead 14 in FIG. 1.

Figure 3:
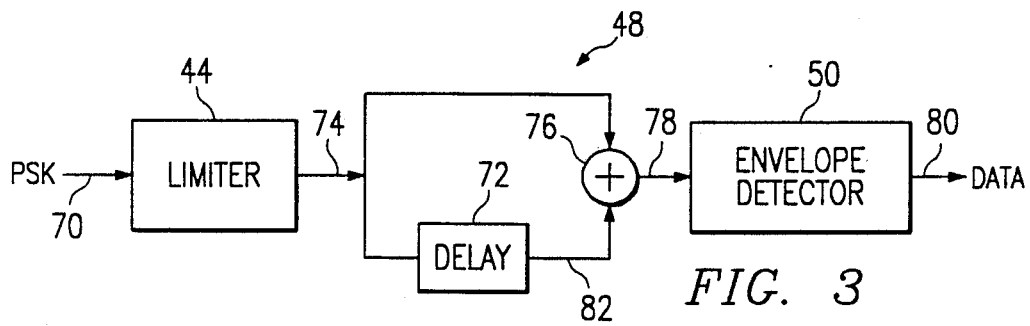
FIG. 3 is a block diagram showing in more detail a portion of FIG. 2 to emphasize the novel portion.

FIG. 3 uses the same designators where appropriate as was used in FIG. 2 and it illustrates a signal being supplied on a lead 70 to limiter 44 which signal is still a PSK signal even though it is no longer at the original carrier frequency but rather is at an IF frequency and has been bandpass filtered to remove any interfering vestiges of the local oscillator signal or the original carrier signal. Within the delay and add circuit 48, there is a delay block 72 which delays the data output from a lead 74 of limiter 44 by one data bit before being supplied to a summing circuit 76. The summed output from summing circuit 76 is supplied on a lead 78 to the envelope detector 50 before being output as data on lead 80. An output of the delay circuit 72 to the summing circuit 76 is shown as being supplied on a lead 82.

Figure 4:
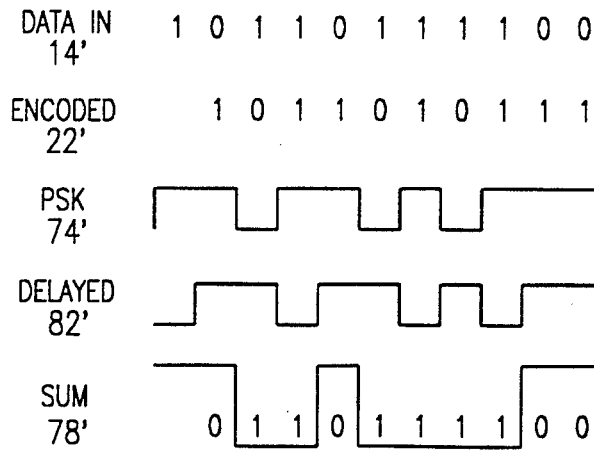
FIG. 4 is a set of waveforms used in explaining the operation of the inventive concept.

In FIG. 4 the first stream of data is the data IN of lead 14 in FIG. 1 while the second stream of data is the differentially encoded data shown on lead 22 of FIG. 1. These signals are basically logic 1 and logic 0 levels and are used to modulate the phase of the carrier 10 in phase modulator 12. The waveform 74' labeled "PSK" is basically the same as that shown in FIG. 3 on a similarly labeled lead and the high values nominally represent a phase of the supporting carrier of one value (i.e., the phase with no vectorially added noise) and the low portions of waveform 74' nominally represent opposite phase values of the carrier. The waveform 82 is designed similarly to that of 74' and merely shows the waveform 74' delayed by one data bit but having the same representations of phase. The waveform 78' illustrates the waveform after being summed and it shows that when the two signals 74' and 82' are of the same phase, they will combine to produce a large negative value but when opposite phase signals are combined, they cancel each other and cause the signal 78' to be a substantially 0 value relative a given reference. Although the 0 voltage level values are shown as a logic 1 and the large values a logic 0, this is merely a detail in logic circuitry which can be taken care of through the use of an inverter where appropriate. The primary item to note is that the binary value fluctuations of waveform 78' follow the binary value alterations of waveform 14'.

OPERATION

As previously indicated, the prior art typically has used a double balanced mixer to demodulate PSK signals. However, double balanced mixers meeting user requirements for performance become increasingly expensive as the data bit rate rises. There have been prior art attempts to use a summing circuit and an envelope detector in the prior art which comprise essentially blocks 48 and 50 of FIG. 3 without the limiter 44 but such demodulators cannot, in the presence of noise, provide a signal upon which correct decisions can as reliably be made.

A further known detection method is designated as coherent detection and provides a more optimum demodulation result than does either of the previously mentioned prior art demodulators. Again, however, cost of same has been a negative factor in the common usage of such a circuit.

The present invention, as previously mentioned, adds the limiter 44 to the prior art delay and sum approach to remove the amplitude variations produced in the phase-shift keyed signal as noise signals are vectorially added to the PSK signal. This limiter is used to reduce the amplitude to a value which is less than the normal minimum amplitude value of the PSK carrier signal. This limiting action provides a three decibal (db) increase in signal-to-noise ratio. When dealing with high data bit rates, a three db alteration in signal-to-noise ratio is very significant in obtaining a given bit error rate. The noise that is removed by the limiter may include receiver noise and in the case of laser beams, quantum noise.

For those who are mathematically inclined, it will be apparent that an input signal can be described by the following equation:

$$i(t) = [A + N_C(t)] \cos [\omega t + \theta_K] - N_S(t) \sin [\omega t + \theta_K] \quad (1)$$

In the above equation, i (t) is indicative of the input signal as a function of time (t), A is indicative of the amplitude of the carrier wave which is being keyed as to phase shift in accordance with the data amplitude, ($\omega$) is indicative of the frequency of the carrier wave, $\theta_K$ is indicative of the data phase (either nominally zero or pi without the addition of noise) and $N_C$ and $N_S$ are the in and quad phase components of zero mean gaussian noise. The gaussian noise being discussed has a variance of $\sigma$ squared. Generally, the signal-to-noise ratio of a signal is given by:

$$SNR_{in} = A^2/2\sigma^2 \text{ input} \quad (2)$$

The input signal of Equation 1 would be the signal found at the input 70 of limiter 44. The output of limiter 44 designated as 74 in FIG. 3 may be defined by the following equation:

$$L_O(t) = A_L \cos (\omega t + \theta_K + \psi(t)) \quad (3)$$

Where $A_L$ is the limiter output level and $A_L$ is much less ($<<A$) than the amplitude of A used in conjunction with Equation 1 for optimum BER performance. Further, in Equation 3, $\psi(t) = \tan^{-1} [N_S(t)/(A + N_C(t))]$.

It may be determined by measurements or mathematical analysis that a normal delay and multiply circuit has an error probability ($P_E$) of $\frac{1}{2} \exp(-SNR_{in})$. A prior art delay and add circuit without a limiter, on the other hand, had an error probability of the data stream of $\frac{1}{2} \exp(-SNR_{in}/2)$. While a glance at the equation in the prior sentence might lead one to believe that the delay and add circuit would have twice the error rate of a delay and multiply circuit, the exponential function is such that a delay and add circuit requires twice the signal-to-noise ratio to give the same bit error rate as previously obtained in a multiply-type demodulator PSK circuit. Looking at the equation from a different viewpoint, if it be assumed that the signal-to-noise ratio is 20, a delay and multiply circuit would have a probability of error approximately equal to $1 \times 10^{-9}$ while the delay and add detector would give an error probability of approximately equal to $2 \times 10^{-5}$. Thus, the delay and add circuit would provide an error rate under the assumed signal-to-noise ratio of about 20,000 times greater. Since present day requirements for phase-shift keyed circuits are that the error probability be no greater than $10^{-9}$, delay and add circuits have typically been shunned by circuit designers. However, by adding the limiter, the error probability of a demodulator of the type shown in FIG. 3, has exactly the same error probability as obtained in the prior art delay and multiply circuits, or in other words, $\frac{1}{2} \exp(-SNR_{in})$.

While the mathematics explaining the effect of a non-limited signal in a simple delay and add demodulator may be deemed quite complicated, the net effect is that without the limiter, the shot noise and receiver circuit noise, in combination with the time varying phase noise, operates to detrimentally affect the accuracy of decision circuit 56 of FIG. 2. The decision circuit 56 is what is typically used to decide whether the envelope of the detected signal is a logic 1 or a logic 0 at a given time as determined by the clock from the clock recovery circuit 46. In effect, the noise reduces the definability of the logic levels, or in different words, alters the amplitude in a detrimental manner so that the data stream on 58 may not accurately reflect the data originally encoded as it appeared on lead 14 of FIG. 1.

The addition of the limiter to the simple delay and add circuit results in a circuit which has a performance substantially equal to the typically more complicated and expensive double balanced mixer circuit typically used in the art and thus, is a cost effective approach to demodulating phase-shift keyed signals. Further, due to limitations of practical implementation of a multiply demodulator, the performance of the present concept application is likely to be superior in high bit rate applications to that of the delay and multiply demodulator.

It should be noted that the present invention can be applied equally well to delay and substract circuits used in the demodulating section of a PSK demodulator as it does to the described delay and add circuit.

It should also be noted that the function of delay and add or delay and subtract in a PSK demodulator can be achieved by means other than that shown in the application. One such approach to achieving the function of delay and adding can constitute a simple transmission line stub which will cause the signal to travel along the transmission line as well as being directed towards ground and reflected to be re-added to the original signal as time delayed by the time necessary for it to travel from the stub to ground and return. While it is not intended that transmission line theory be taught in this application, it is believed appropriate to point out that there are many ways of practicing the inventive concept other than the exact circuitry illustrated.

Finally, it is believed appropriate to point out that optimum performance will be achieved from the demodulator if the amplitude of the PSK signal is limited to a value less than the minimum value of input amplitude variation. However, performance less than optimum will be achieved by any type of limiting and this less than optimum limiting continues to improve the bit error rate as the amount of limiting is increased from "none" to the stated optimum value.

I thus wish to be limited not by the specific limiter and demodulator approach shown, but only by the scope of the appended claims wherein I claim:

1. Differential demodulation apparatus comprising, in combination:
   first means for supplying a PSK (phase-shift keyed) signal to be demodulated;
   amplitude limiter second means, including output means, connected to said first means for receiving PSK signals to be demodulated therefrom;
   summing third means, including first and second input means and output means;
   signal delay fourth means, connected between said output means of said second means and said first input means of said third means, for delaying signals passing therethrough by a time equal to one data bit;
   fifth means connecting said output means of said second means to said second input means of said third means; and
   envelope detector sixth means, including apparatus output means, connected to said output means of said third means for receiving summed signals therefrom whereby an envelope shape is extracted representing data.

2. The method of demodulating a high bit rate phase-shift keyed signal comprising, the steps of:
   limiting a P.S.K. (phase-shift keyed) signal to remove amplitude fluctuations of the signal as received whereby a non-delayed version of the P.S.K. signal is produced;
   delaying the limited signal by a time equivalent to one bit period;
   summing the delayed and non-delayed version of the limited signals together to obtain an A.S.K. (amplitude shift keyed) signal; and
   detecting the envelope of the ASK signal to obtain a differential amplitude signal.

3. The method of detecting a phase-shift keyed signal comprising, the steps of:
   amplitude limiting a phase-shift keyed signal to produce a non-delayed phase-shift keyed signal;
   generating a one bit delayed version of the limited signal;
   summing the one bit delayed version of a phase-shift keyed signal with the non-delayed version of the phase-shift keyed signal to produce a differential amplitude shift keyed signal; and
   envelope detecting the differential amplitude shift keyed signal to provide an output indicative of the original data.

4. Apparatus for demodulating a high bit rate phase-shift keyed signal comprising, in combination:
   signal source first limiting means for supplying a non-delayed amplitude limited carrier phase-shift keyed signal to be demodulated;
   delay second means, connected to said first means and including output means, for delaying the limited signal by a time equivalent to one data bit period; and
   summing third means, connected to said first limiting and second means, for summing the delayed and non-delayed versions of the signals together to obtain a differential resultant (amplitude shift keyed) signal (A.S.K.).

5. The method of improving the performance of a demodulator comprising the steps of:

limiting the amplitude of a carrier phase-shift keyed signal, before demodulating, to remove noise components;

splitting the signal that was previously limited into first and second signals;

differentially delaying one of said first and second signals with respect to the other;

summing the differentially delayed signal with the other of said first and second signals; and demodulating the signal resulting from the summing operation.

6. Demodulation apparatus comprising, in combination:

first means for supplying a PSK (phase-shift keyed) signal, representative of data bits, to be demodulated;

amplitude limiter second means connected to said first means for receiving PSK signals to be demodulated therefrom said second means including output means;

summing third means, including first and second input means and output means;

signal delay fourth means, connected between said output means of said second means and said first input means of said third means, for delaying signals passing therethrough by a time equal to one data bit; and fifth means connecting said output means of said second means to said second input means of said third means, the output of said third means being indicative of the originally modulated data.

* * * * *